July 2, 1957

R. C. CARROLL ET AL 2,797,722

TIRE ADAPTER MEANS

Filed Jan. 4, 1956

INVENTOR
RAYMOND C. CARROLL
PARKER O. THOMPSON
BY
ATTORNEY

United States Patent Office 2,797,722
Patented July 2, 1957

2,797,722

TIRE ADAPTER MEANS

Raymond C. Carroll, Enid, Okla., and Parker O. Thompson, South San Antonio, Tex.

Application January 4, 1956, Serial No. 557,362

1 Claim. (Cl. 152—404)

This invention relates to the provision of means for enabling the mounting of a tire having an oversize inside diameter on a wheel designed for a tire having a smaller inside diameter. More specifically, the invention is directed to means for the conversion of a standard wheel of the type having side peripheral flanges and two frusto-conical bead engaging surfaces to an oversize wheel capable of receiving a non-standard tire with an oversize inside bead diameter.

The heavy aircraft of today use massive tires which after a certain period of use must be discarded for reasons of safety. These tires, while not in good enough condition for further aircraft use, have proved to be highly satisfactory for use on heavy construction equipment, such as earth moving vehicles and the like. The inside bead diameters of the used aircraft tires are larger than those of standard tires used on the wheels of the earth moving vehicles. By my invention, these used aircraft tires may be effectively used on the standard wheels. A considerable financial saving is realized since the used aircraft tires can be utilized without any significant or expensive alteration to the standard wheel. The adapter means of my invention may be easily mounted on standard heavy construction equipment wheels without any modification of the wheel structures whatsoever, thereby enabling interchangeable use of standard and oversize tires as desired.

The invention comprises a set of adapter rings mountable on a standard heavy-duty wheel of known design, such a wheel having side peripheral flanges for engagement of the side walls of a tire. The substantially cylindrical rim of the wheel has frusto-conical surfaces at either end which are coaxial with the wheel axis and which taper inwardly toward each other to provide two tapered seats.

Each adapter ring of the set has an inner frusto-conical surface which is mounted in tight face-to-face contact with its respective frusto-conical surface of the wheel. The rings are preferably slit to enable their compression into better gripping engagement with the wheel when the tire is inflated. The outer annular surfaces of the adapter rings receive the inner annular bead surfaces of the oversized tire. The dimension of the side walls of the rings is less than the dimension of the wheel peripheral flanges to enable contact of the tire side walls with the outer opposed annular portions of the peripheral flanges of the wheel.

Various other objects and meritorious features of the invention will be apparent from the following description taken in conjunction with the drawings, wherein like numerals refer to like parts throughout the several figures, and wherein.

Figure 1:
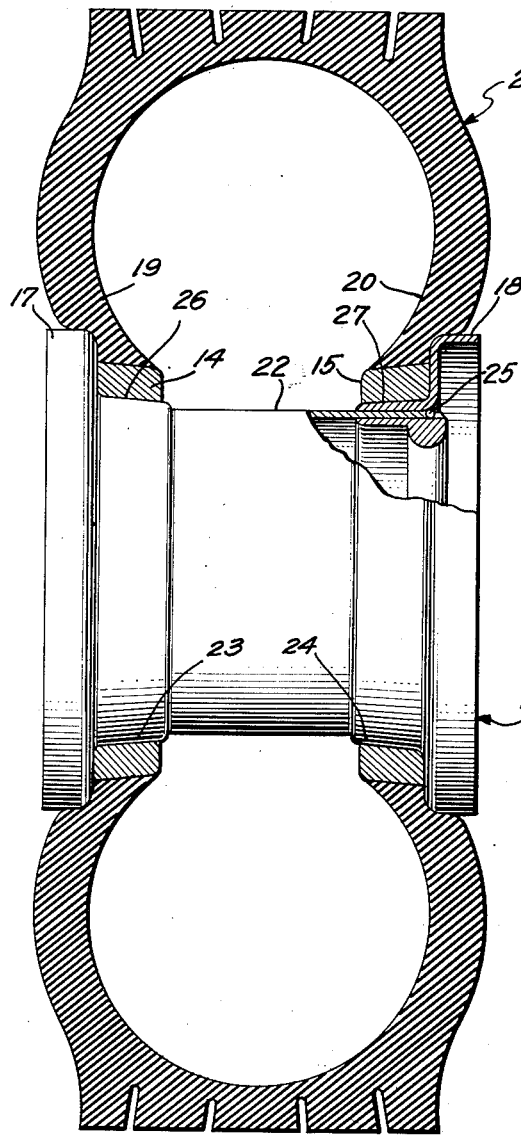
Fig. 1 is a cross-sectional view of a wheel and tire assembly employing the adapter means of the present invention.
Figure 2:
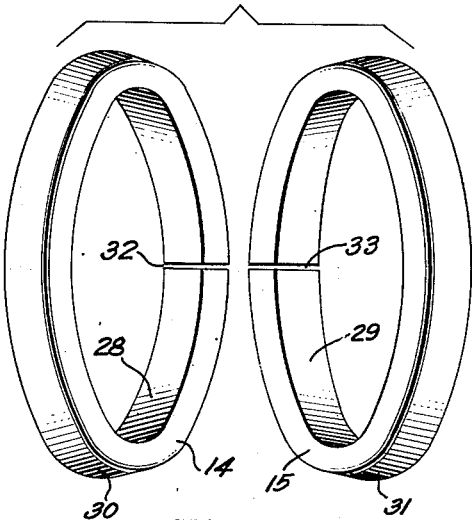
Fig. 2 is a view of a set of adapter rings.

As seen in Figs. 1 and 2, the adapter rings 14 and 15 are specifically designed for mounting on a wheel 16 having side peripheral flanges 17 and 18 which engage the side walls 19 and 20 respectively of the tire 21. The wheel has a rim 22 to which the side peripheral flanges 17 and 18 are attached, the inner annular tapered lips 23 and 24 of the flanges being slidably received on the rim and locked thereon by locking ring means of standard design. As seen in Fig. 1, the peripheral flange 18 is mounted in position on the rim 22 by means of a lock ring 25 which is removably received in an annular slot in the rim structure. Wheels of this construction are well known in the art. Upon removal of the peripheral flange 18, a tire may be easily slid into place, after which the flange 18 is replaced and locked in position by the locking ring 25. The tapered lips 23 and 24 of the flanges 17 and 18 respectively provide frusto-conical surfaces 26 and 27 respectively which are coaxial with the wheel axis and which taper inwardly toward each other at 5-degree angles with the horizontal.

Non-standard tires having an oversize inside diameter are mountable on the standard wheel by use of the set of adapter rings shown in Fig. 2. It will be noted that the inner surfaces 28 and 29 of the two rings in the set are conically tapered in opposite directions and conform precisely with the opposed conical 5-degree tapers of the surfaces of the lips 23 and 24 respectively of the wheel. Further, it will be noted that the outer surfaces 30 and 31 of the rings 14 and 15 respectively are similarly tapered at a 5-degree angle to provide frusto-conical surfaces for engagement by the inner annular bead surface of the oversize non-standard tire 21.

Figure 3:
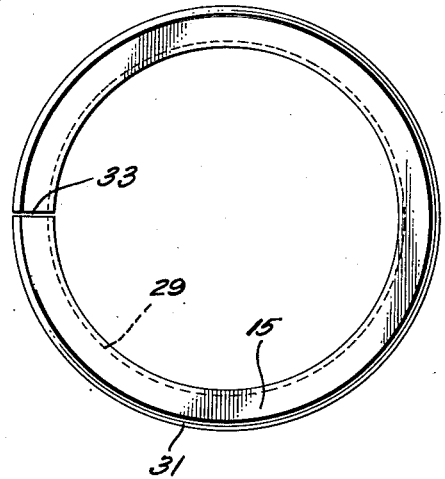
Fig. 3 is a side view of one of the adapter rings.

As seen in Figs. 2 and 3, the adapter rings 14 and 15 are cut to provide spaces 32 and 33 extending from their inner walls 28 and 29 to their outer walls 30 and 31 respectively to form a discontinuous ring which will be pressed into extremely tight face-to-face engagement with the wheel upon inflation of the tire.

The rings of this invention are preferably cast from iron, steel or aluminum and must be made with precision. The outer and inner frusto-conical surfaces are ground to a smooth finish to insure complete face-to-face contact and thereby develop sufficient frictional forces to prevent slipping of the adapter rings on the wheel. The tire in turn keeps its position on the adapter rings by frictional engagement therewith as well as on the outer opposed annular portions of the peripheral flanges.

It will be noted that the set of adapter rings can be installed without modification of existing standard wheels on earth moving equipment and that the various sizes of standard wheels in use as well as oversize tires available can be used one with another by proper selection of adapter ring dimensions.

While a preferred embodiment of the invention has been described herein, various modifications will be apparent to those skilled in the art and for that reason we wish to limit ourselves only within the scope of the appended claim.

We claim:

A wheel and tire assembly embodying a tire of larger inside diameter than the outside diameter of the wheel rim on which it is mounted, said assembly comprising at each end of the wheel rim a right-angled end flange having one leg of approximately the dimension of the thickness of the tire shoulder bead frictionally sleeved over one end of the wheel rim and another leg extending radially away from said rim, a separate split metallic adapter ring of approximately the same width as the length of the sleeved leg of said end flange seated thereover, said adapter ring being of a thickness substantially less than the length of the radially extending leg of said end flange whereby said leg extends radially beyond the outer face of said adapter ring, a tire having the transverse face of its shoulder bead seated upon the outer surface of said adapter ring and the outer side surface of said bead engaging the radial leg of said end flange, and a locking ring seated in said rim exteriorly of said end flange and engaging the same to positively prevent its outward axial movement.

References Cited in the file of this patent

UNITED STATES PATENTS 2,614,603     Howley _____ Oct. 21, 1952